(12) United States Patent
Ji et al.

(10) Patent No.: US 11,593,586 B2
(45) Date of Patent: **\*Feb. 28, 2023**

(54) OBJECT RECOGNITION WITH REDUCED NEURAL NETWORK WEIGHT PRECISION

(71) Applicant: Samsung Electronics Co., Ltd., Suwon-si (KR)

(72) Inventors: Zhengping Ji, Pasadena, CA (US); Ilia Ovsiannikov, Studio City, CA (US); Yibing Michelle Wang, Temple City, CA (US); Lilong Shi, Pasadena, CA (US)

(73) Assignee: SAMSUNG ELECTRONICS CO., LTD.

( * ) Notice: Subject to any disclaimer, the term of this patent is extended or adjusted under 35 U.S.C. 154(b) by 779 days.

This patent is subject to a terminal disclaimer.

(21) Appl. No.: 16/553,158

(22) Filed: Aug. 27, 2019

(65) Prior Publication Data

US 2019/0392253 A1 Dec. 26, 2019

Related U.S. Application Data

(63) Continuation of application No. 14/663,233, filed on Mar. 19, 2015, now Pat. No. 10,417,525.

(Continued)

(51) Int. Cl.
*G06K 9/62* (2022.01)
*G06N 3/04* (2006.01)
(Continued)

(52) U.S. Cl.
CPC ......... *G06K 9/6232* (2013.01); *G06K 9/6267* (2013.01); *G06K 9/6272* (2013.01);
(Continued)

(58) Field of Classification Search
CPC .. G06K 9/6232; G06K 9/6267; G06K 9/6272; G06N 3/0454; G06N 3/084
See application file for complete search history.

(56) References Cited

U.S. PATENT DOCUMENTS 4,994,927 A  2/1991 Dixit et al.
5,101,361 A  3/1992 Eberhardt
(Continued)

FOREIGN PATENT DOCUMENTS

CN  101299233 A  11/2008
CN  102411708 A  4/2012
(Continued)

OTHER PUBLICATIONS

Vanhoucke, Vincent, Andrew Senior, and Mark Z. Mao. "Improving the speed of neural networks on CPUs." (2011). (Year: 2011).*

(Continued)

*Primary Examiner* — Utpal D Shah
(74) *Attorney, Agent, or Firm* — Renaissance IP Law Group LLP

(57) ABSTRACT

A client device configured with a neural network includes a processor, a memory, a user interface, a communications interface, a power supply and an input device, wherein the memory includes a trained neural network received from a server system that has trained and configured the neural network for the client device. A server system and a method of training a neural network are disclosed.

20 Claims, 13 Drawing Sheets

Related U.S. Application Data

(60) Provisional application No. 62/053,692, filed on Sep. 22, 2014.

(51) Int. Cl.
  *G06N 3/08* (2006.01)
  *G06N 3/084* (2023.01)
  *G06V 10/44* (2022.01)
  *G06V 30/10* (2022.01)

(52) U.S. Cl.
  CPC .......... *G06N 3/0454* (2013.01); *G06N 3/084* (2013.01); *G06V 10/454* (2022.01); *G06V 30/10* (2022.01)

(56) References Cited

U.S. PATENT DOCUMENTS

| | | | |
|---|---|---|---|
| 5,444,796 A | 8/1995 | Ornstein | |
| 5,689,581 A | 11/1997 | Nakao et al. | |
| 5,717,833 A | 2/1998 | Neely | |
| 5,812,993 A | 9/1998 | Ginosar et al. | |
| 5,835,901 A | 11/1998 | Duvoisin et al. | |
| 5,966,701 A | 10/1999 | Kohda et al. | |
| 6,038,337 A | 3/2000 | Lawrence et al. | |
| 6,128,606 A | 10/2000 | Bengio et al. | |
| 6,255,987 B1 | 7/2001 | Lancashire et al. | |
| 6,324,532 B1 | 11/2001 | Spence et al. | |
| 6,513,023 B1 | 1/2003 | Duong | |
| 6,608,924 B2 | 8/2003 | Soliman | |
| 6,718,045 B2 | 4/2004 | Donescu et al. | |
| 6,836,767 B2 | 12/2004 | McBride | |
| 6,976,012 B1 | 12/2005 | Rising, III | |
| 7,123,655 B2 | 10/2006 | Kerofsky | |
| 7,236,615 B2 | 6/2007 | Miller et al. | |
| 7,286,699 B2 | 10/2007 | Simard et al. | |
| 7,295,687 B2 | 11/2007 | Kee et al. | |
| 7,346,208 B2 | 3/2008 | Staelin et al. | |
| 7,593,574 B2 | 9/2009 | Simard et al. | |
| 7,634,137 B2 | 12/2009 | Simard et al. | |
| 7,747,070 B2 | 6/2010 | Puri | |
| 8,055,018 B2 | 11/2011 | Han et al. | |
| 8,081,816 B1 | 12/2011 | Irick et al. | |
| 8,160,139 B2 | 4/2012 | Shindo | |
| 8,229,734 B2 | 7/2012 | Bennett | |
| 8,234,228 B2 | 7/2012 | Weston et al. | |
| 8,341,100 B2 | 12/2012 | Miller et al. | |
| 8,345,984 B2 | 1/2013 | Ji et al. | |
| 8,385,971 B2 | 2/2013 | Rhoads et al. | |
| 8,463,025 B2 | 6/2013 | Melvin et al. | |
| 8,582,807 B2 | 11/2013 | Yang et al. | |
| 8,625,917 B2 | 1/2014 | Zheng et al. | |
| 8,737,986 B2 | 5/2014 | Rhoads et al. | |
| 8,886,579 B2 | 11/2014 | Webber | |
| 9,251,431 B2 | 2/2016 | Doepke et al. | |
| 9,324,022 B2 | 4/2016 | Williams et al. | |
| 9,336,483 B1 | 5/2016 | Abeysooriya et al. | |
| 9,398,205 B2 | 7/2016 | Côté et al. | |
| 9,836,692 B1 | 12/2017 | Gulland | |
| 10,115,393 B1 | 10/2018 | Kumar et al. | |
| 2004/0199482 A1 | 10/2004 | Wilson | |
| 2006/0164420 A1 | 7/2006 | Cheng | |
| 2006/0193520 A1 | 8/2006 | Mita et al. | |
| 2006/0204103 A1 | 9/2006 | Mita et al. | |
| 2007/0033279 A1 | 2/2007 | Battat et al. | |
| 2008/0222646 A1 | 9/2008 | Sigal et al. | |
| 2009/0116747 A1 | 5/2009 | Duong et al. | |
| 2010/0260426 A1 | 10/2010 | Huang et al. | |
| 2011/0029471 A1 | 2/2011 | Chakradhar et al. | |
| 2011/0182469 A1 | 7/2011 | Ji et al. | |
| 2012/0229826 A1 | 9/2012 | Zolnay | |
| 2012/0259804 A1 | 10/2012 | Brezzo et al. | |
| 2013/0339281 A1 | 12/2013 | Datta et al. | |
| 2014/0079315 A1 | 3/2014 | Kozitsky et al. | |
| 2014/0089232 A1 | 3/2014 | Buibas et al. | |
| 2014/0270431 A1 | 9/2014 | Xu et al. | |
| 2015/0170020 A1 | 6/2015 | Garimella | |
| 2015/0324690 A1 | 11/2015 | Chilimbi et al. | |
| 2015/0347819 A1 | 12/2015 | Yin et al. | |
| 2016/0078339 A1 | 3/2016 | Li et al. | |
| 2016/0321784 A1 | 11/2016 | Annapureddy | |
| 2016/0328646 A1 | 11/2016 | Lin et al. | |
| 2016/0328647 A1 | 11/2016 | Lin et al. | |
| 2016/0358069 A1 | 12/2016 | Brothers et al. | |
| 2016/0358075 A1 | 12/2016 | Zhang et al. | |
| 2017/0132511 A1 | 5/2017 | Gong et al. | |
| 2017/0286830 A1 | 10/2017 | El-Yaniv et al. | |
| 2018/0018560 A1 | 1/2018 | Saldana et al. | |
| 2018/0046913 A1 | 2/2018 | Yu et al. | |
| 2018/0110493 A1 | 4/2018 | Golan | |
| 2018/0314940 A1 | 11/2018 | Kundu et al. | |

FOREIGN PATENT DOCUMENTS

| | | |
|---|---|---|
| CN | 102663432 A | 9/2012 |
| WO | 2009149926 A2 | 12/2009 |
| WO | 2016037350 A1 | 3/2016 |

OTHER PUBLICATIONS

Beiu, Valeriu, et al. "Closse approximations of sigmoid functions by sum of step for vlsi implementation of neural networks." Sci. Ann. Cuza Univ. 3 (1994): 5-34. (Year: 1994).

Bengio, Yoshua, "Learning Deep Architectures for AI," Foundations and Trends in Machine Learning, vol. 2, No. 1, pp. 1-127, 2009.

Boser, Bernhard E., et al., "An Analog Neural Network Processor with Programmable Topology", IEEE Journal of Solid-State Circuits, vol. 26, No. 12, Dec. 1991.

Deng, Jia, et al., "ImageNet: A Large-Scale Hierarchical Image Database", IEEE Computer Vision and Pattern Recognition (CVPR), 2009.

Denton, Emily L., et al. "Exploiting linear structure within convolutional networks for efficient evaluation." Advances in neural information processing systems. 2014. (Year: 2014).

Fiesler, E., Choudry, A., & Caulfield, H. J. (Aug. 1990) Weight discretization paradigm for optical neural networks. In the Hague'90,Apr. 12-16 (pp. 164-173). International Society for Optics and Photonics.

Hartigan, J.A., et al., "Algorithm AS 136: A K-Means Clustering Algorithm", Journal of the Royal Statistical Society, Series C (Applied Statistics), vol. 28, No. 1, pp. 100-108, 1979.

Jaderberg, Max, et al. "Speeding up convolutional neural networks with low rank expansions." arXiv preprint arXiv: 1405 3866 (2014). (Year: 2014).

Ji, Z. et al. "Reducing Weight Precision of Convolutional Neural Networks towards Large-scale On-chip Image Recognition" Proc of SPIE vol. 9496 (2015), pp. 94960A-1-94960A-9.

Karan, O., et al., (2012). Diagnosing diabetes using neural networks on small mobile devices. Expert Systems with Applications, 39(1), 54-60.

LeCun, Y. et al., "Handwritten digit recognition with a backpropagation network," 1989. In Neural Information Processing Systems (NIPS).

LeCun, Yann, et al., "Gradient-Based Learning Applied to Document Recognition." Proceedings of the IEEE, vol. 86, No. 11, pp. 2278-2324, Nov. 1998.

Lloyd, Stuart P., "Least Squares Quantization in PCM", IEEE Transactions on Information Theory, vol. 28, No. 2, Mar. 1982.

Moerland, P., et al., (1997). Neural network adaptations to hardware implementations (No. EPFL-REPORT-82423). IDIAP.

Nasrabadi, N. M., et al., (Jul. 1988). Vector quantization of images based upon the Kohonen self-organizing feature maps. In Proc. IEEE Int. Conf. Neural Networks (vol. 1, pp. 101-105).

Scardapane, Simon. "Compressing deep neural networks, Challenges and theoretical foundations." 2018. University of Exeter. PowerPoint presentation. (Year: 2018).

Vanhoucke, Vincent, et al. "Improving the speed of neural networks on CPUs." Proc. Deep Learning and Unsupervised Feature Learning NIPS Workshop. vol. 1. 2011. (Year: 2011).

(56) References Cited

OTHER PUBLICATIONS

Xie, Yun, et al., "Analysis of the Effects of Quantization in Multilayer Neural Networks Using a Statistical Model", IEEE Transactions on Neural Networks, vol. 3, Issue 2, Mar. 1992.
Zeng, Xiaoqin, et al., "Sensitivity Analysis of Multilayer Perceptron to Input and Weight Perturbations", IEEE Transactions on Neural Networks, vol. 12, Issue 6, Nov. 2001.
Ma, Haiyun, "Process Oriented Software Design and Optimization Technology," National Defense Industry Press, China, Nov. 30, 2013.
Wang, Chong et al., "Basic Principle Course of Modern Information Retrieval Technology," Press of Xidian University, China, Nov. 30, 2013.

\* cited by examiner

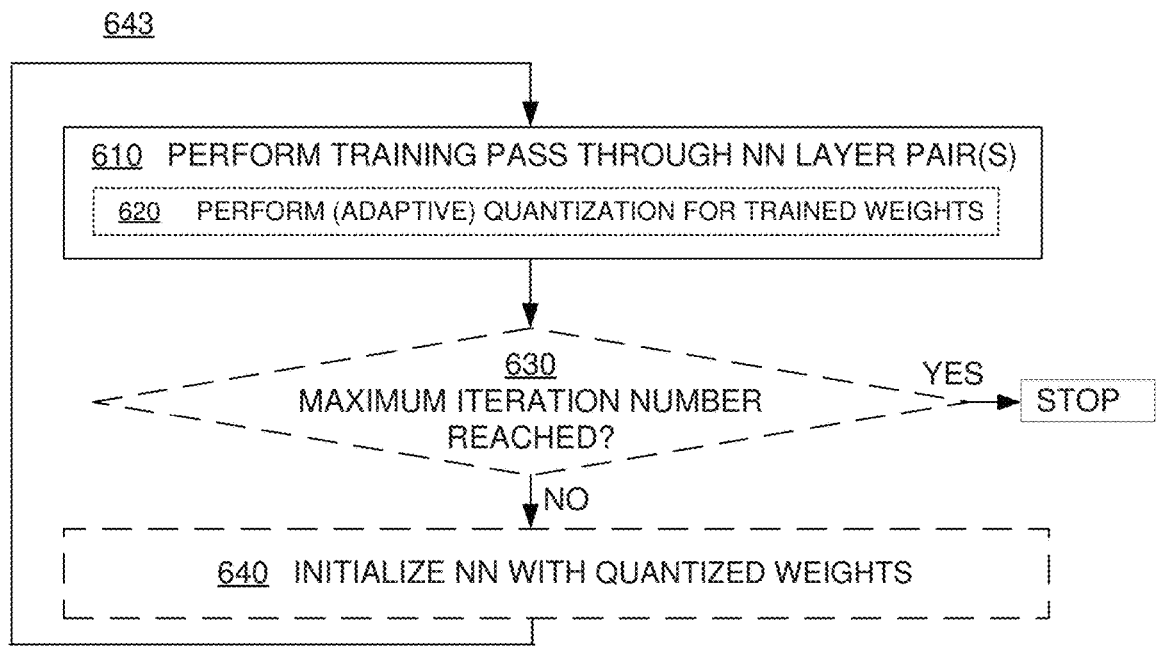
FIG. 4  *SERVER TRAINING – SUPERVISED ITERATIVE QUANTIZATION*
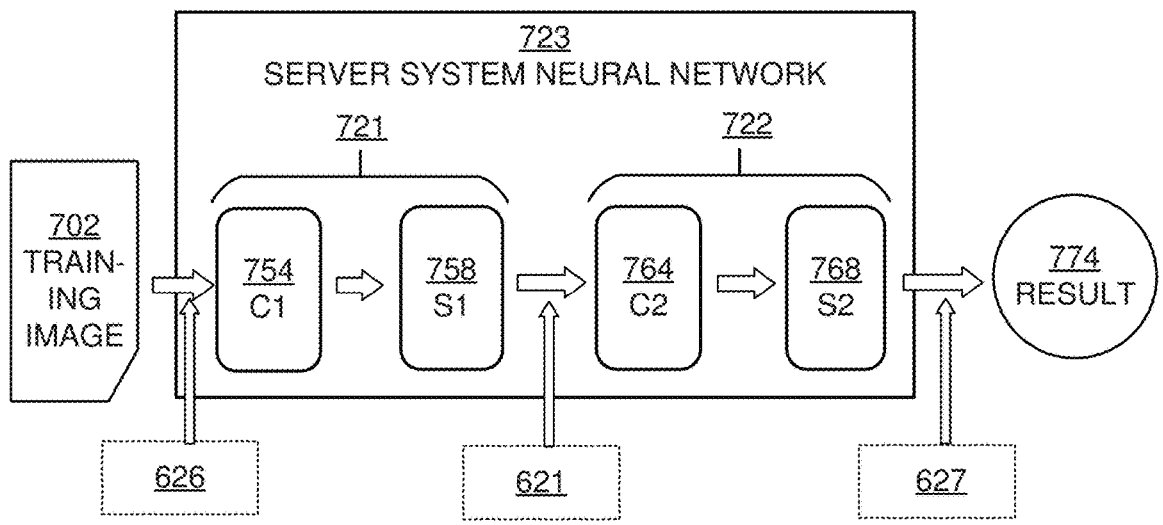
FIG. 5  *SERVER – ADAPTIVE QUANTIZATION*

$$\min_Q \|Q(\mathbf{w}) - \mathbf{w}\|_2^2$$
FIG. 6 <u>ADAPTIVE QUANTIZATION</u>
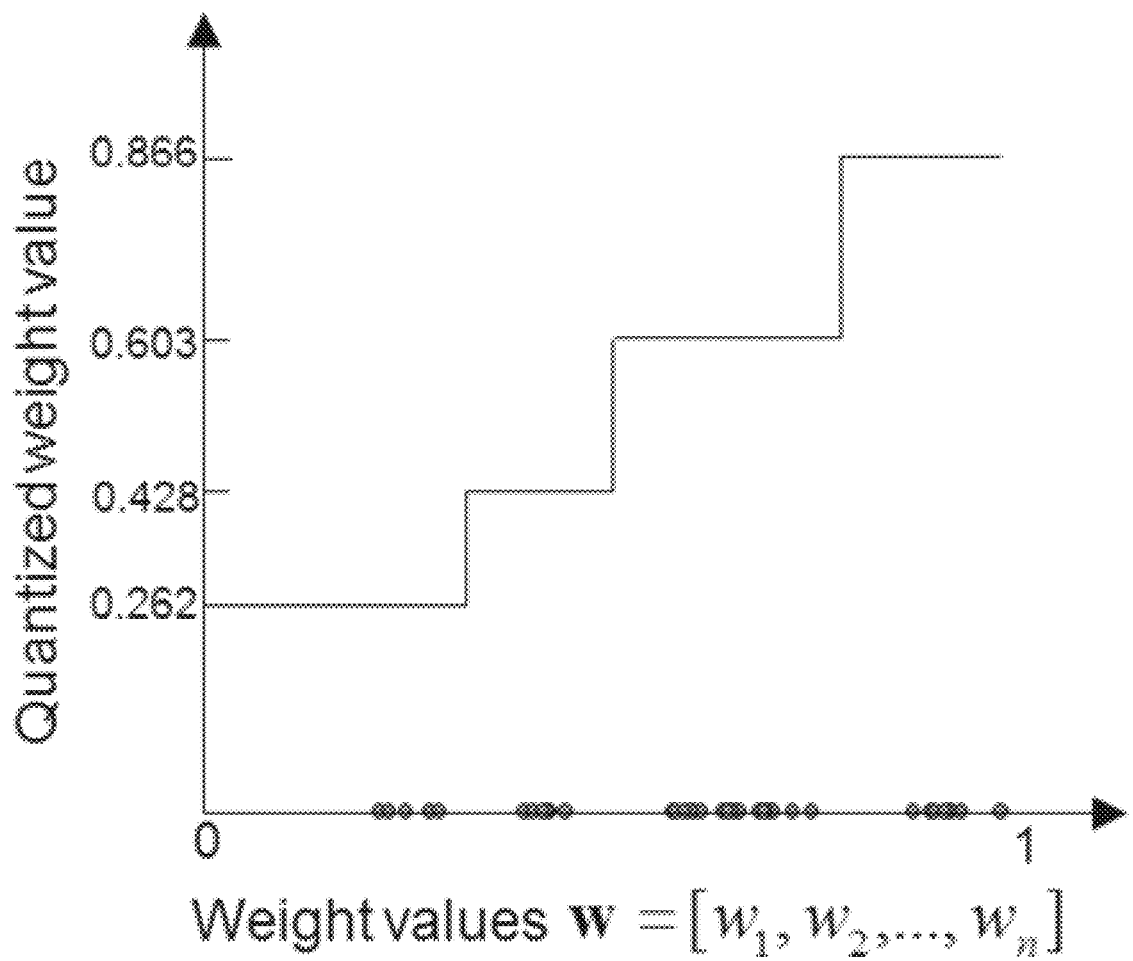
FIG. 7 <u>ADAPTIVE QUANTIZATION</u>

(9A)
$$\min_{Q_l} \|Q_l(\mathbf{w}) - \mathbf{w}\|_2^2$$

(9B)
$$\min_{Q_l} \sum_t \left(y^{(t)} - Class\left(F_2\left(Q_2(\mathbf{w}), F_1\left(Q_1(\mathbf{w}), \mathbf{x}^{(t)}\right)\right)\right)\right)^2$$

(9C)
$$\min_{Q_l} \sum_t \alpha \left(y^{(t)} - Class\left(F_2\left(\mathbf{w}, F_1\left(\mathbf{w}, \mathbf{x}^{(t)}\right)\right)\right)\right)^2 + \sum_l \beta \|Q_l(\mathbf{w}) - \mathbf{w}\|_2^2,$$

FIG. 9

$$Q(\mathbf{w}) = \Delta \bullet \left( \left\lfloor \frac{\mathbf{w}}{\Delta} \right\rfloor + \frac{1}{2} \right)$$

UNIFORM QUANTIZATION

UNIFORM QUANTIZATION

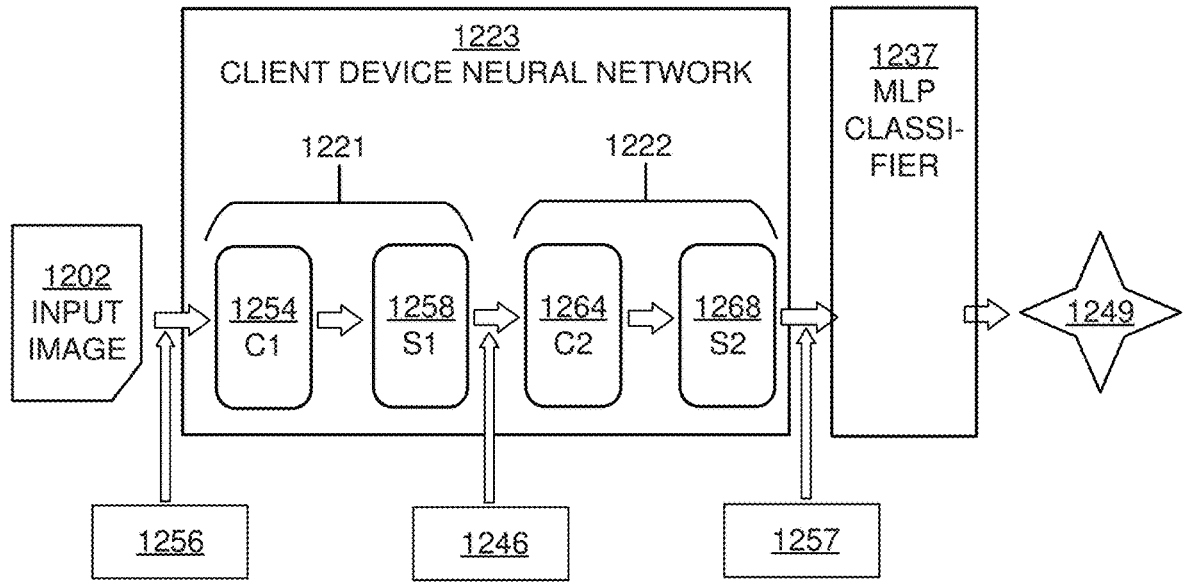
FIG. 12    *CLIENT – RECOGNITION WITH UNIFORM QUANTIZATION*
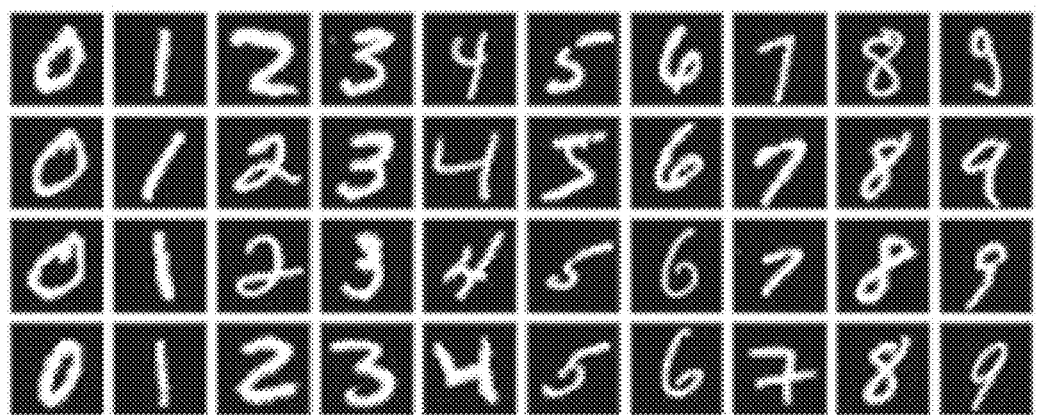
FIG. 13    *SAMPLE TRAINING IMAGES (HAND WRITING)*

RESULTS

| | 1 | 2 | 3 | 4 | 5 | 6 | 7 | 8 | Original |
|---|---|---|---|---|---|---|---|---|---|
| 1 | 0.9072 | 0.7238 | 0.5437 | 0.4542 | 0.4371 | 0.4226 | 0.4187 | 0.4185 | 0.4159 |
| | 0.8567 | 0.5649 | 0.1625 | 0.0725 | 0.0514 | 0.0449 | 0.0407 | 0.0395 | 0.0371 |
| | 0.8025 | 0.2056 | 0.0377 | 0.0241 | 0.0224 | 0.0208 | 0.0214 | 0.0215 | 0.0214 |
| 2 | 0.814 | 0.3183 | 0.1016 | 0.0644 | 0.0548 | 0.0547 | 0.053 | 0.0526 | 0.0518 |
| | 0.765 | 0.2770 | 0.0346 | 0.0177 | 0.0153 | 0.0149 | 0.0144 | 0.0144 | 0.0139 |
| | 0.7954 | 0.2111 | 0.0204 | 0.0135 | 0.014 | 0.0136 | 0.014 | 0.014 | 0.014 |
| 3 | 0.7687 | 0.2513 | 0.0289 | 0.0143 | 0.0123 | 0.0123 | 0.0121 | 0.0122 | 0.0121 |
| | 0.7424 | 0.2489 | 0.0309 | 0.0132 | 0.0119 | 0.0117 | 0.0112 | 0.011 | 0.0111 |
| | 0.7402 | 0.18 | 0.0169 | 0.0121 | 0.0111 | 0.011 | 0.0113 | 0.0111 | 0.0111 |
| 4 | 0.7294 | 0.2217 | 0.0242 | 0.0123 | 0.0118 | 0.0113 | 0.0113 | 0.0113 | 0.0114 |
| | 0.7452 | 0.2463 | 0.0282 | 0.0121 | 0.0123 | 0.012 | 0.0118 | 0.0118 | 0.0119 |
| | 0.7584 | 0.2122 | 0.0163 | 0.0115 | 0.0106 | 0.0098 | 0.0096 | 0.0099 | 0.01 |
| 5 | 0.7315 | 0.2326 | 0.0262 | 0.0125 | 0.0121 | 0.0116 | 0.012 | 0.0119 | 0.0117 |
| | 0.7421 | 0.2429 | 0.0275 | 0.0125 | 0.0121 | 0.0117 | 0.0116 | 0.0113 | 0.0115 |
| | 0.7334 | 0.1938 | 0.0184 | 0.0112 | 0.0096 | 0.0095 | 0.0096 | 0.0095 | 0.0095 |
| 6 | 0.7471 | 0.2523 | 0.0297 | 0.0132 | 0.0124 | 0.0118 | 0.0119 | 0.0117 | 0.0117 |
| | 0.7421 | 0.2429 | 0.0275 | 0.0125 | 0.0121 | 0.0117 | 0.0116 | 0.0113 | 0.0115 |
| | 0.7444 | 0.197 | 0.018 | 0.0112 | 0.0097 | 0.0096 | 0.0094 | 0.0097 | 0.0097 |
| 7 | 0.739 | 0.2382 | 0.0278 | 0.0127 | 0.0121 | 0.0118 | 0.0117 | 0.0116 | 0.0116 |
| | 0.7421 | 0.2429 | 0.0275 | 0.0125 | 0.0121 | 0.0117 | 0.0116 | 0.0115 | 0.0115 |
| | 0.7561 | 0.2038 | 0.0177 | 0.0101 | 0.0097 | 0.0095 | 0.009 | 0.0091 | 0.0093 |
| 8 | 0.7383 | 0.2397 | 0.0271 | 0.0126 | 0.0122 | 0.0119 | 0.0117 | 0.0115 | 0.0118 |
| | 0.7421 | 0.2429 | 0.0275 | 0.0125 | 0.0121 | 0.0117 | 0.0116 | 0.0113 | 0.0115 |
| | 0.7498 | 0.1953 | 0.0167 | 0.0108 | 0.0094 | 0.0093 | 0.0092 | 0.0091 | 0.0093 |
| Original | 0.7421 | 0.2429 | 0.0275 | 0.0125 | 0.0121 | 0.0117 | 0.0116 | 0.0115 | 0.0115 |
| | 0.743 | 0.1895 | 0.0165 | 0.0101 | 0.0091 | 0.0092 | 0.0092 | 0.0093 | 0.0093 |

No. of Input Resolution Bits →

No. of Weight Resolution Bits →

FIG. 15

FIG. 16 — COMPARING AVERAGE TESTING ERROR

COMPARING AVERAGE TESTING ERROR

SIMULATION RESULT

OBJECT RECOGNITION WITH REDUCED NEURAL NETWORK WEIGHT PRECISION

CROSS REFERENCE TO RELATED PATENT APPLICATIONS

This application is a continuation of U.S. patent application Ser. No. 14/663,233, filed Mar. 19, 2015, which claims priority from U.S. Provisional Patent Application Ser. No. 62/053,692, filed on Sep. 22, 2014, the disclosure of which is hereby incorporated by reference.

BACKGROUND

Increasingly, machines (i.e., computers) are used to provide machine vision or object recognition. Object recognition provides users with a variety of beneficial tools.

In some instances, object recognition relies upon algorithms that include a neural network. That is, a device may recognize that an object is within an input image by using a neural network. Generally, the neural network has been trained to recognize objects through prior use of training images. This object recognition process can become more discerning if more training images are used for the object.

Generally, neural networks include systems of interconnected "neurons." The neural networks compute values from inputs and are capable of machine learning as well as pattern recognition as a result of their adaptive nature.

Neural networks for image recognition require data processes for learning and for recognition that are memory and processing intensive, and therefore computationally expensive. Indeed, the values of the weights require memory space for storage and for processing during computational processes.

As might be expected, increasing the size of a training data set improves the performance of a neural network. Unfortunately, in a mobile device such as a smartphone, memory and processing capabilities are comparatively limited. Accordingly, the increasingly pervasive use of mobile devices generally has not benefitted from image recognition technology.

What are needed are methods and apparatus to provide for improved performance of a neural network on a computing device that has limited resources.

BRIEF SUMMARY

The present description gives instances of server systems for image recognition training that may generate configuration information for neural networks, client devices for performing image recognition using neural networks that work based on downloaded neural network configuration information, and methods, the use of which may help overcome problems and limitations of the prior art.

In one embodiment, a client device is configured with a neural network. The client device includes a processor, a memory, a user interface, a communications interface, a power supply and an input device, wherein the memory includes a trained neural network received from a server system that has trained and configured the neural network for the client device.

The input device may be configured to capture an image and to store image input data in the memory. The client device may further include a multilayer perceptron (MLP) classifier configured to map image input data. The neural network may include a convolutional neural network. The neural network may be configured to generate a feature map; the feature map may include a plurality of weight values derived from an input image; the neural network may be configured to perform a quantization operation on the feature map; the quantization operation may include one of unitary quantization, adaptive quantization, uniform quantization, and supervised iterative quantization; the quantization may perform back-propagation (BP) of image input data. The neural network may be configured to perform object recognition. The neural network may provide output of a recognition operation. The client device may include one of a smartphone, a tablet computer and a portable electronic device.

In another embodiment, a system for providing object recognition with a client device is provided. The system includes a server system configured for training a neural network to perform object recognition and exporting the neural network to the client device.

The system may further include the client device comprising a processor, a memory, a user interface, a communications interface, a power supply and an input device; and, the memory comprising the trained neural network received from the server system. The server system may include a database of training images. The neural network may include a convolutional neural network; the convolutional neural network may include at least two layers; the convolutional neural network may include a convolutional layer and a subsampling layer; the server system may include a multilayer perceptron (MLP) classifier. The server system may be configured to employ a learning technique for the training; and the learning technique may include one of a back-propagation (BP), Restricted Boltzmann Machine, and Auto Encoder Decode technique.

In another embodiment, a server system is provided. The server system includes an input device configured to receive a training image; a neural network that includes at least two layer pairs, each layer pair including a convolutional layer and a subsampling layer; a multilayer perceptron (MLP) classifier; wherein the neural network is configured to perform quantization of interim weights in the convolutional layers, and the neural network is also configured to generate in the subsampling layer an interim feature map in response to an input applied to the convolutional layer; and the neural network configured to perform quantization of weights in the MLP classifier, and the neural network is configured to generate in the MLP classifier a classification output in response to the feature map being applied to quantized weights MLP.

In another embodiment, a method for training a neural network configured for object recognition using a client device, the method may include receiving an input image with the neural network; performing a training pass through the neural network, the training pass including a quantization operation; configuring the neural network with weight values from the quantization operation; configuring the neural network for use by the client device; and, at least one of storing the neural network in a server system and exporting the neural network to the client device.

In yet another embodiment, a computer program product stored on non-transitory machine readable media is included. The computer program product may include machine executable instructions for training a neural network configured for object recognition using a client device, by executing a method that includes: receiving an input image with the neural network; performing a training pass through the neural network, the training pass including a quantization operation; configuring the neural network with weight values from the quantization operation; configuring the neural network for use by the client device; and, at least one of storing the neural network in a server system and exporting the neural network to the client device.

Advantages over the prior art include cost savings for client devices made according to embodiments, with acceptable or even no degradation of performance. Indeed, the memory requirement may be lower for storage and also processing to recognize objects, which results in lower area requirements, lower power consumption, and thus lower cost.

These advantages can be important for mobile devices. Indeed, such devices may be able to perform on-chip image recognition in real-time, which can be useful in mobile applications such as context awareness.

BRIEF DESCRIPTION OF THE DRAWINGS

The features and advantages of the invention are apparent from the following description taken in conjunction with the accompanying drawings in which:

FIG. 4 is a flowchart illustrating a neural network training process in a training flowchart of FIG. 1, according to embodiments.

FIG. 5 is a sample block diagram of a neural network for a server system, which further illustrates where a quantization operation of the flowchart of FIG. 4 can be applied according to embodiments.

FIG. 6 is a sample equation expression that may be used in a one-dimensional adaptive quantization operation.

FIG. 7 is a sample diagram for illustrating a one-dimensional example of an adaptive quantization operation resulting by applying the equation expression of FIG. 6.

FIG. 9 shows sample equation expressions for performing embodiments of adaptive quantization operations.

FIG. 12 is a sample block diagram of a neural network for a client device, which further illustrates where a quantization operation can be applied according to embodiments.

FIG. 13 is a group of sample training images for handwriting recognition used for performing simulations.

FIG. 15 is a table showing simulation results that contrast the simulated performance of embodiments over the prior art.

DETAILED DESCRIPTION

Figure 1:
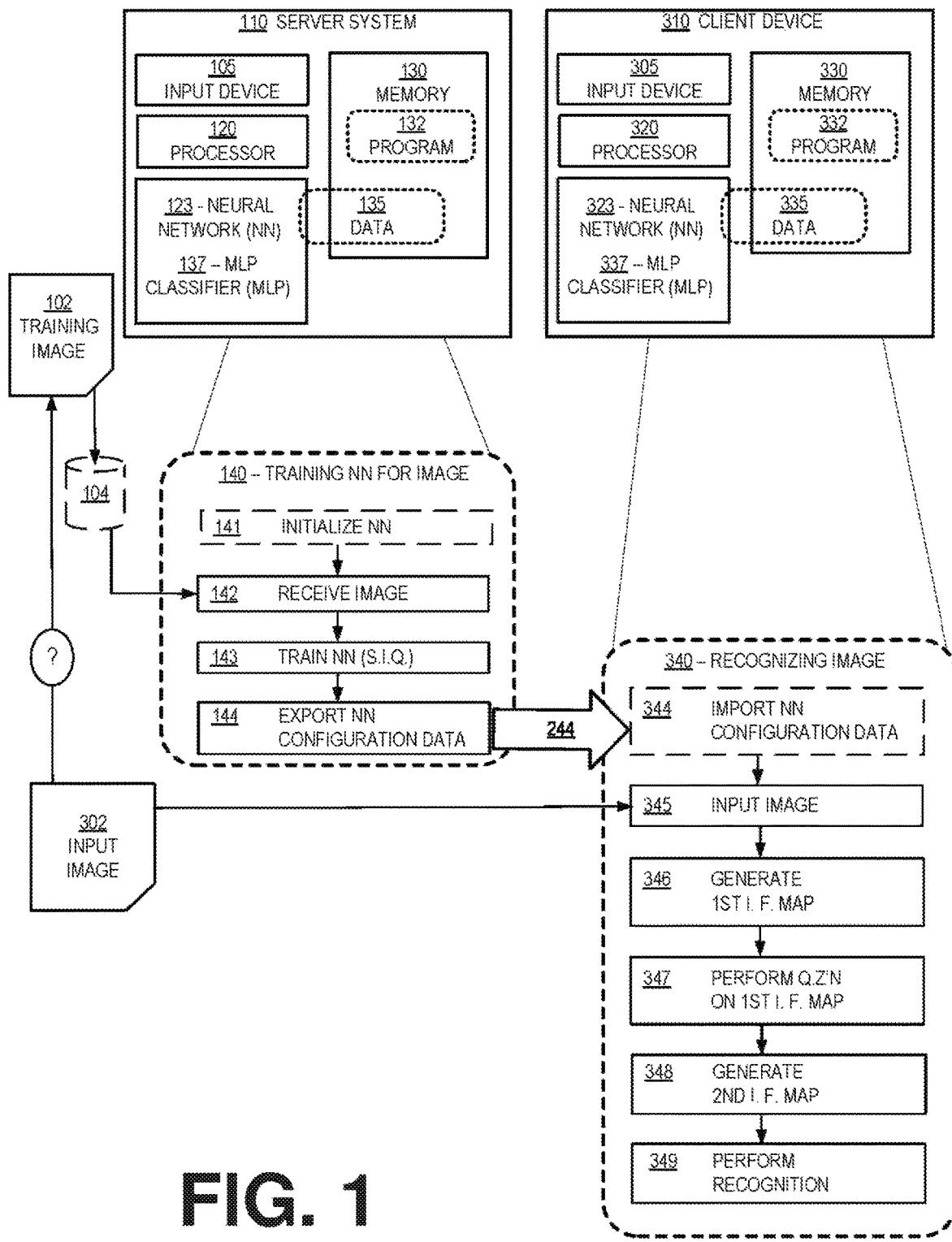
FIG. 1 is a composite diagram of block diagrams of a sample server system and a sample client device according to embodiments, flowcharts according to embodiments, and other interrelated aspects.

Disclosed herein are methods and apparatus that provide for efficient operation of a neural network on a client that has limited resources. Generally, the methods and apparatus provide for building a convolutional neural network (CNN) on a device that has substantial computing resources (such as a server) using a computationally intensive learning process. Once built, the neural network may be ported to a client device that has comparatively limited computing resources (such as a smartphone).

Neural networks are useful for a variety of computationally complicated tasks. For example, a neural network may be useful for object recognition. Object recognition may provide for facial recognition, environmental surveillance, to control production and manufacturing, to assist with medical diagnostics, and a variety of other similar processes.

Types of neural networks include those with only one or two layers of single direction logic, to complicated multi-input many directional feedback loops and layers. Generally, these systems use algorithms in their programming to determine control and organization of their functions. Most systems use "weights" (which can be expressed as values) to change the parameters of the throughput and the varying connections to the neurons. Neural networks can be autonomous and learn from prior training accomplished through use of sets of training data.

In order to provide some context for the teachings herein, some aspects are now introduced.

As discussed herein, the term "server" generally refers to a computing resource that has robust computational resources. Exemplary resources include those important for performing tasks described herein, and may include substantial memory, processing capabilities, data storage and the like. In exemplary embodiments, the server includes a conventional server (such as a blade server) a mainframe, a network of personal computers, or simply a personal computer (PC).

As discussed herein, the term "client" generally refers to a computing resource that has a reduced set of computational resources. Exemplary resources include those important for performing tasks described herein, and may include a minimal amount of memory, processing capabilities, data storage and the like. In some embodiments, the client includes imaging capabilities to provide for collection of input images that are input into the neural network.

As discussed herein, the term "neural network" generally refers to statistical learning algorithms having an adaptive nature and is therefore useful in machine learning. The neural network may include a plurality of artificial nodes, known as "neurons," "processing elements," "units," or by other similar terms and which are connected together to form a network which mimics a biological neural network. Generally, a neural network includes sets of adaptive weights (i.e. numerical parameters that are tuned by a learning algorithm), and are capable of approximating non-linear functions of their inputs. The adaptive weights are conceptually connection strengths between neurons, which are activated during training and prediction. Generally, a neural network operates on a principle of non-linear, distributed, parallel and local processing and adaptation.

As discussed herein, the term "multilayer perceptron (MLP)" generally refers to a feedforward artificial neural network that maps sets of input data onto a set of appropriate outputs. Accordingly, an MLP classifier may perform the recognition from the output of a neural network. An MLP may include a sequence of layers of nodes in a directed graph, with each layer connected to the next. Except for the input nodes, each node is a neuron (or processing element) that can have a nonlinear activation function.

In general, "convolution" is a mathematical operation on two functions, f and g, producing a third function that may be viewed as a modified version of one of the original functions, giving the area overlap between the two functions as a function of the amount that one of the original functions is translated.

In general, the term "convolutional neural network" is a type of feed-forward artificial neural network where the individual neurons are tiled in such a way that they respond to overlapping regions in the visual field. Convolutional networks are variations of multilayer perceptrons (MLP) and are designed to use minimal amounts of preprocessing. When used for image recognition, a convolutional neural network uses multiple layers of small neuron collections which look at small portions of the input image, called "receptive fields." The results of these collections are then tiled so that they overlap to obtain a better representation of the original image. This is repeated for every such layer. Advantageously, a convolutional neural network may use shared weight in convolutional layers. Thus, the same filter (weights bank) is used for each pixel in the respective layer. This both reduces required memory size and improves performance.

As discussed herein, the term "image" refers to a two-dimensional array of digitized image data, however, this is merely illustrative and is not limiting. As discussed herein, images provided to the server may be collected by another device such as a camera (not shown) and prepared for training by intermediate tools (such as software) and configured to mimic the form of images provided by the client (for example). Images collected by the client may be provided in a digitized form (such as from a camera in a smartphone). In exemplary embodiments, aspects such as dimensions and number of pixels of training images are generally equivalent to the dimensions and number of pixels of production images. Further, merely for purposes of distinguishing training images from other images collected during operation of the client, images used for training the server are referred to as "training images." Images collected by the client are referred to as "production images" and by other similarly distinct terms.

As discussed herein, an "object" may appear in or be contained within an image. For example, a car (object) may appear within a picture (image) of a landscape (collection of objects).

As discussed herein, the terms "program," "software," "application," "add-in," and other similar terms refer to machine executable instructions stored on non-transitory machine readable media. The machine executable instructions provide for execution of a method through control of computing resources and any associated components deemed appropriate.

In the exemplary embodiments, the methods and apparatus are useful for performing object recognition from image data. The exemplary embodiments are to be considered as merely illustrative and are not limiting of the teachings herein. Accordingly, the methods and apparatus disclosed may be used equally well for other applications.

FIG. 1 depicts aspects of a server system 110 (also referred to as the server 110) and a client device 310 (also referred to as the client 310). An abbreviated flowchart is associated with each of the server 110 and the client 310. A first flowchart 140 depicts aspects of training the neural network 123 as performed by the server 110. A second flowchart 340 depicts aspects of recognizing an image as performed by the client 310.

FIG. 1 shows aspects of an exemplary server system 110. Flowchart 140 introduces exemplary operations for the server system 110. Training image 102 may optionally be stored in a training database 104. Briefly, server system 110 can be trained using training image 102, from which server system 110 can generate a configuration of learned weights. Training is discussed in greater detail further herein.

Server system 110 includes an input device 105 that is configured to receive training image 102, such as from training database 104. Input device 105 may include a digitizer, such as a scanner, or another similar device. Input device 105 may be implemented in many similar other ways.

Server system 110 also includes a multilayer perceptron (MLP) classifier 137. Neural network (NN) 123 and MLP classifier 137 may use a supervised learning technique such as "Back-Propagation (BP)" for training the neural network (NN) 123. In some embodiments, MLP classifier 137 is a modification of a standard linear perceptron, and may even distinguish data that are not linearly separable. Being a neural network, MPL classifier 137 could be considered part of neural network (NN) 123. Accordingly, neural network (NN) 123 and MLP classifier 137 are shown grouped together in FIG. 1.

Server system 110 also includes a memory 130 that can store a program 132. Server system 110 additionally includes a processor 120 and the neural network (NN) 123. Data 135 may be stored in memory 130 and may be stored in the neural network (NN) 123.

FIG. 1 additionally shows aspects of a sample client device 310. Associated with the client device is flowchart 340 that introduces exemplary operations for the client device 310. Briefly, client device 310 can receive according to export operation 244. The export operation 244 provides the configuration of learned weights that were generated by server system 110. Accordingly, client device 310 may be able to recognize training image 102 in input image 302 once properly configured.

Client device 310 includes an input device 305 that is configured to receive input image 302, for performing image recognition. Client device 310 also includes a memory 330 that can store a program 332, a processor 320 and a neural network (NN) 323. Data 335 may be stored in memory 330 and also in neural network (NN) 323.

Client device 310 may also include a multilayer perceptron (MLP) classifier 337. MLP classifier 337 may perform the recognition from the output of neural network (NN) 323. As discussed above, an MLP may include a sequence of layers of nodes in a directed graph, with each layer connected to the next. Except for the input nodes, each node is a neuron (or processing element) that can have a nonlinear activation function. Neural network (NN) 323 and MLP classifier 337 may use a supervised learning technique called Back-Propagation (BP) for training the network. Being a neural network, MLP classifier 337 could be considered part of neural network (NN) 323, or as a separate module. In the embodiments presented herein, the MLP classifier 337 is presented as a separate module so that commonalities between neural network (NN) 323 and neural network (NN) 123 can be better described.

Some similarities are shown in the block diagrams of server system 110 and client device 310. Notwithstanding these similarities, some of functions and requirements may be very different. For example, server system 110 is not necessarily portable. More specifically, server system 110 may have a large memory 130 and substantial processing 120 used to generate configurations. Client device 310 may be presented in a variety of forms, some of which may be portable or not. The client device 310 may be a portable personal electronic device, and it may further include a touchscreen. Examples of the client device 310 include a smartphone (such as an iPhone from Apple Corporation of Cupertino, Calif., or a device implementing the Android operating system from Google Corporation of Mountain View, Calif.), a tablet computer or other similar device.

Neural networks (NN) 123 and 323 include artificial intelligence (AI) technology, and can be used for learning and recognition, respectively. This description proceeds mostly in terms of neural networks (NN) 123 and 323 being convolutional neural networks, but other types of neural networks may be used.

In some embodiments of neural networks (NN) 123 and 323, a single layer is used. The single layer which may contain a number of neurons. Each neuron may be considered to be a processing unit. Each neuron may perform a transformation, such as a non-linear transformation. There can be weighted connections among neurons within the layer. The weighted connections may be stored as the weight values in memories of the neural network. A learning algorithm may be configured for learning the weight values.

In some embodiments, deep learning may be used. Deep learning involves a hierarchical architecture composed of multiple layers, similar to the foregoing layers. In addition, the weighted connections are among neurons within a layer and also across the multiple layers. Deep learning thus requires a substantial amount of memory 130. Examples of deep learning include back-propagation (BP), Restricted Boltzmann Machine, Auto Encoder Decode, etc. An example of a deep learning architecture for a neural network (NN) is now described.

Figure 2:
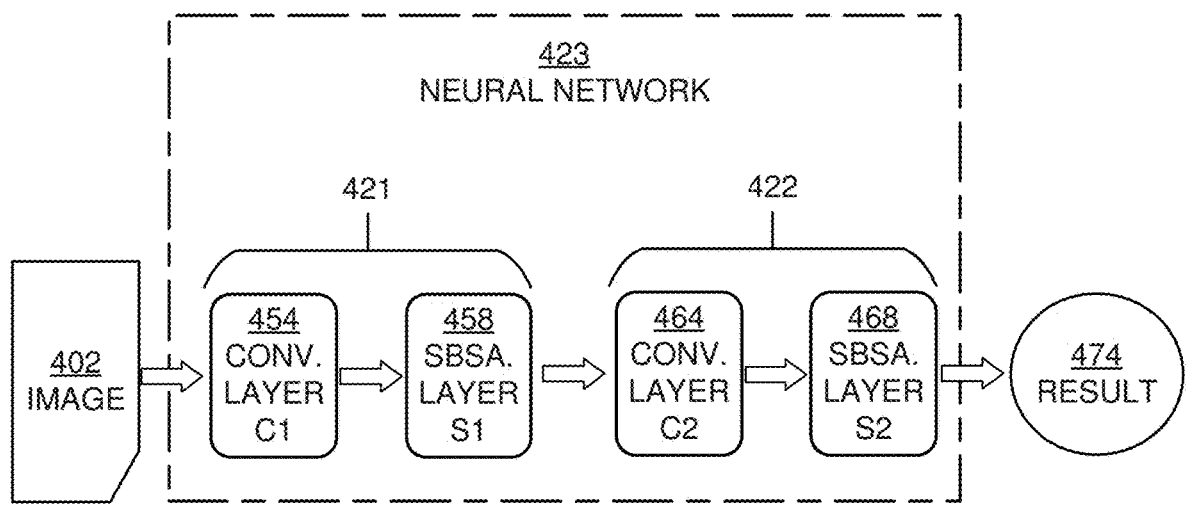
FIG. 2 is a composite diagram of a sample block diagram of a neural network of either the server or the client of FIG. 1, and further illustrating possible operations according to embodiments.

FIG. 2 is a block diagram depicting exemplary aspects of neural network (NN) 423. Neural network (NN) 423 is an example of the above-described neural network (NN) 123, neural network (NN) 323, or both.

In the example of FIG. 2, neural network (NN) 423 includes at least a first layer pair 421 of a first convolutional (C1) layer 454 and a first subsampling (S1) layer 458. Neural network (NN) 423 also includes a second layer pair 422 of a second convolutional (C2) layer 464 and a second subsampling (S2) layer 468. Pair 421 may be similar to pair 422, although that is not required. In some embodiments, pair 421 and pair 422 have different numbers of feature maps.

An image 402 may be received by neural network (NN) 423, and more particularly by first convolutional layer 454. Neural network (NN) 423 may thus generate a result 474 due to receiving image 402. Result 474 is an output generated in second subsampling layer 468, after any iterations have been completed. In training mode, image 402 is a training image and result 474 may be the generated learned weights for recognizing image 402 in other input images. In object recognition mode, image 402 is an input image and result 474 may be used by MLP classifier 337 to indicate a specific object recognized within input image 402. Layer pairs 421, 422 are now described in more detail with regard to FIG. 3.

Figure 3:
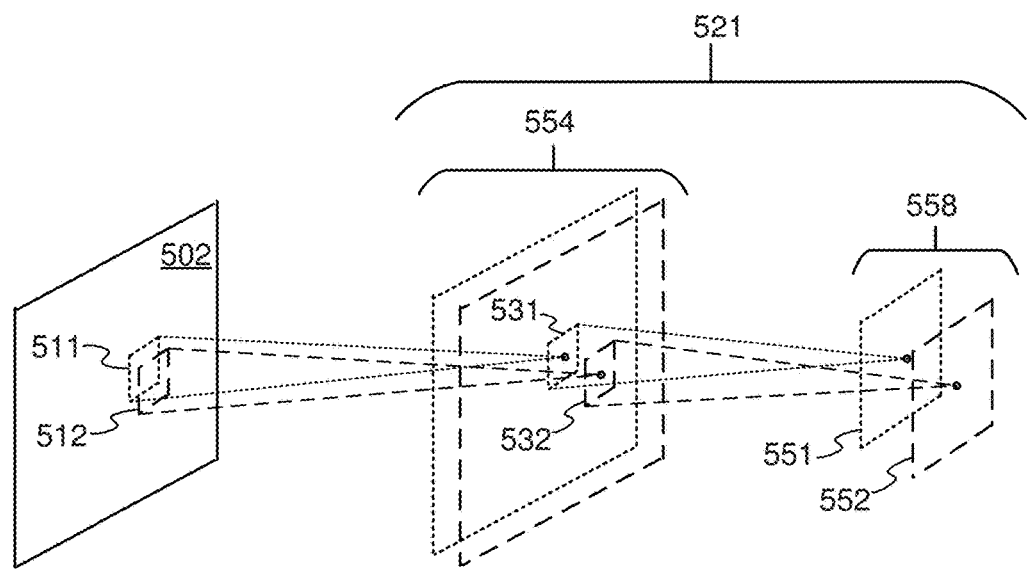
FIG. 3 is a diagram illustrating a sample pair of a convolutional layer and a subsampling layer for explaining operations of components of FIG. 2 according to embodiments.

FIG. 3 is a diagram illustrating a sample layer pair 521 of a convolutional layer 554 and a subsampling layer 558. Layer 554 and subsampling layer 558 of pair 521 are examples of embodiments of the layers of pair 421, 422, or both 421 and 422. These are explained in terms of receiving an image 502 which, for this example, may contain weight kernels 511, 512.

Convolutional layer 554 may contain feature maps 531, 532, by storing their respective weights. In practice, there can be many more than two feature maps, but only two are shown in this diagram for simplicity. While in a training operation, each of these feature maps in layer 554 can be the convolved operation result generated by convolving weight kernels 511, 512 with local weight kernels. While in object recognition operation, each of these feature maps in layer 554 can be convolved with the input image to generate possible recognition of the object that generated the feature map.

In addition, subsampling layer 558 may contain the same number of feature maps as the convolutional layer 554. In this case, subsampling layer 558 contains a first feature map 551 and a second feature map 552. Each of the feature maps (551, 552) in layer 558 can be the result of subsampling feature maps of the convolutional layer 554. Subsampling reduces the dimension of the featured map in a structured way. Subsampling may be maximum or average subsampling over neurons within the feature maps or across different feature maps.

Feature maps 531, 532, 551, 552 are genuine feature maps. In some instances within this disclosure, they may be referred to as "interim" feature maps, however, because they may be further processed by another layer to generate an updated version of the feature map.

Returning now to FIG. 1, aspects of exemplary server-to-device solutions are described for server system 110 and client device 310. These solutions involve performing the training/learning process on the server system 110, and then exporting the learned configuration (i.e., network weights) for the neural network (NN) 123 to the client device 310. The exporting is shown in FIG. 1 as export operation 244. Exporting operation 244 provides configuration information for the neural network (NN) 123 to the client device 310. Until the configuration information is exported, the configuration information may reside in a memory, for example, as additional data 135 in memory 130, data storage (not shown) or another suitable repository. The configuration information may be exported to a variety of client devices such as the client device 310 shown in FIG. 1. Client device 310 can be a mobile device that receives or imports the neural network configuration.

It will be appreciated that in some embodiments, at least a portion of the storage and computational resources used by client device 310 may be remote, such as on-board server system 110. Server system 110 that trains a neural network can be located in the "cloud" (that is, at least a portion of the server system 110 is implemented remotely from the client device 310). In some embodiments, the server system 110 may be provided by a public or non-dedicated service. In some embodiments, a client device 310 may be configured such that performance of object recognition with the client device 310 is substantially equivalent to object recognition performed by the server system 110. That is, in some embodiments, the client device 310 is configured with adequate training information such that object recognition for more training images may be performed without substantially degraded performance. Comparative performance may be measured real time, which can be useful for mobile devices.

In some embodiments, computational requirements for client device 310 may be reduced. For example, in some embodiments, a lesser bit resolution may be adequate for storing and processing the network weights. Original double precession may not be needed. Such economies may enable the neural network 323 to operate with low-precision calculations. In some embodiments, it is possible to use analog memory.

Exemplary training processes are now described using flowchart 140 of FIG. 1. These training processes may be used for server system 110 or other systems. The processes of flowchart 140 will be described in terms of components of server system 110 as an example only.

According to an optional operation 141, all or parts of neural network 123 can be initialized prior to use of training image 102. In embodiments that use a layer pair, such as that of FIG. 3, the first convolutional layer can be initialized prior to the training image being applied. This initializing can be, for example, with random weights or another non-image specific configuration.

According to another operation 142, a training image can be received, for example via input device 105. In the example of FIG. 1, the received training image is image 102, perhaps from training image database 104. Operation 140 may be repeated many times for training for different images. Operation 140 may be repeated many times for training all the images within the training image database 104.

According to another operation 143, neural network (NN) 123 can be trained in ways that will be described shortly. According to another operation 144, a configuration of neural network (NN) 123 that is generated after operation 143 can be exported. Operation 144 may be performed in a manner that is substantially similar to, or the same as, the previously described export operation 244.

FIG. 4 describes exemplary embodiments of the training of operation 143 with greater detail. The embodiments presented describe learning weights with reduced bit resolution in more detail. Some of these embodiments are referred to as "Supervised Iterative Quantization (S.I.Q.)."

In FIG. 4, an exemplary method of training 643 is shown. More specifically, FIG. 4 depicts exemplary aspects for training the neural network to generate weights with reduced bit resolution. The result of the method of training 643 is quantized weights, which are exported to the client device 310 for recognition. The reduction of bit resolution for input and feature maps is not mandatory in training.

In this example, the method of training 643 includes a training pass operation 610, according to which a training pass is performed through layer pairs for neural network (NN) 123. The training pass operation 610 includes quantization operation 620, according to which quantization is performed at one or more junctures. Accordingly, quantization operation 620 modifies the training pass operation 610 in ways that will be explained shortly.

According to another, optional operation 630, an inquiry is made as to whether a maximum iteration number has been reached. If the answer is "yes," then execution of the method of training 643 is ended. If the answer is "No," then according to initialization operation 640, all or part of the neural network (NN) 123 may be initialized again. Once re-initialized, the neural network (NN) 123 may apply a version of weights quantized from the quantization operation 620.

After the initialization operation 640, execution can return to the training pass operation 610, and so on. The iteration of the exemplary method of training 643 can be performed a few times.

The training pass operation 610 and the quantization operation 620 embedded therein are now described in more detail. The description relates in particular to embodiments of the server system 110 that use a neural network (NN) with layer pairs such as those presented in FIG. 2.

FIG. 5 is a block diagram depicting aspects of the quantization operation 620 for an exemplary neural network (NN) 723 of an embodiment of the server system 110. In this example, the neural network (NN) 723 is similar to the above-described neural network (NN) 123.

Referring to FIG. 5, in an exemplary quantization operation 720, the neural network (NN) 723 receives a training image 702, and generates a result 774. The result 774 stands for generated learned weights that can be used later for recognizing whether training image 702 contains a certain object whose label is defined in the training process. The neural network (NN) 723 includes at least a first layer pair 721 of a first convolutional (C1) layer 754 and a first subsampling (S1) layer 758. Neural network (NN) 723 also includes a second layer pair 722 of a second convolutional (C2) layer 764 and a second subsampling (S2) layer 768. Layer pairs 721, 722 may be made as described above.

In FIG. 5, arrows show the effect of the training pass operation 610 and the quantization operation 620. In embodiments, the neural network (NN) 723 is first initialized with random weights or another non-image specific configuration. Training image 702, which has been received by the input device, is applied to first convolutional layer 754. As mentioned above, first convolutional layer 754 may have been initialized prior to training image 702 being applied to it.

Neural network (NN) 723 can be configured to generate in first subsampling layer 758 a first interim feature map, in response to training image 702 being applied to first convolutional layer 754. This first interim feature map could be generated based on first interim original weights.

As part of this training pass, the first interim feature map can be applied to second convolutional layer 764. The neural network (NN) 723 can be configured to generate in second subsampling layer 768 a second interim feature map, in response to the first interim feature map being applied to second convolutional layer 764. This second interim feature map could have second interim original weights.

The resulting feature maps 768 can be used to make a prediction regarding what object mostly likely appears in the image using MLP classifier 137. Based on the error of the prediction and ground truth, back propagation (BP) can be used to adjust (i.e., learn/train) the weights.

The training process may be repeated for all or part of training images in the training database. After that, the learned weights may be quantized using adaptive quantization method based on k-means (which will be described in detail later). Quantization reduces the number of bits of the weights, while still preserving enough of the original data. In this particular case, quantization thus converts the original weights into lower-resolution weights.

In some embodiments, the process of training weights and thereafter quantization is considered as one training epoch.

If training epochs are smaller than a threshold (e.g., the answer at operation 630 is "No"), the training pass operation 610 may be repeated. In such cases, the neural network (NN) 723 may be initialized using quantized weights. Based on the initialization, the neural network (NN) 723 may receive all or part of training images again, use back-propagation (BP) to learn the weights, and then quantize the learned weights.

If training epochs are equal to or larger than a threshold (i.e., the answer at operation 630 is "Yes"), the quantized weights may then be exported.

The process of Supervised Iterative Quantization (S.I.Q) (as outlined in regard to the exemplary process of FIG. 5), involves back-propagation (BP) of training images, adaptive quantization and iteration.

In exemplary embodiments, the input can be optionally quantized at the location shown by an arrow of an operation 626; the first interim feature map can be optionally quantized at the location shown by an arrow of an operation 621; the second interim feature map can then be optionally quantized at the location shown by an arrow of an operation 627. In addition, the first convolutional layer can be configured to become initialized with a version of the second interim feature map, which was generated at the first training pass. The neural network can be further configured to generate in the first subsampling layer an updated first interim feature map, in response to the received training image being applied again to the first convolutional layer. The processor can be further configured to perform quantization of the updated first interim feature map, so as to generate an updated quantized first interim feature map that is configured to be applied to the second convolutional layer. The neural network can be configured to generate in the second subsampling layer an updated second interim feature map, in response to the updated quantized first interim feature map being applied to the second convolutional layer.

Quantization is now described in more detail. Quantization is a method for reducing a number of bits of a vector or a matrix, while still trying to preserve some of its properties. In this particular case, the vector or the matrix can be connected weights, an input image or a feature map. The reduced number of bits may reduce computational complexity. In quantization methods, a data distribution of original weight values is analyzed, and quantized weight values are generated that are used instead of the original weight values. Economies arise in computations where groups of these quantized weight values are similar to each other.

In exemplary embodiments, adaptive quantization is a quantization method where quantized weight values are computed from the original weight values. Examples are now described.

In one dimension, quantized weight values may be sought that minimize equation expressions, such as the equation expression of FIG. 6. FIG. 6 does not show exactly an equation, but an equation expression whose value is to be minimized.

A one-dimensional example of quantization is shown in FIG. 7, where a distribution of original weight values (w) between 0 and 1 is shown in the horizontal axis. These original weight values (w), form clusters among themselves, and thus quantized weight values (Q) are computed as 0.262, 0.428, 0.603 and 0.866. The economy is achieved because the weight value (w) distribution is started with 25-30 original weights whose values are different, and is replaced by quantized weights values (Q) whose values are similar in groups.

Figure 8:
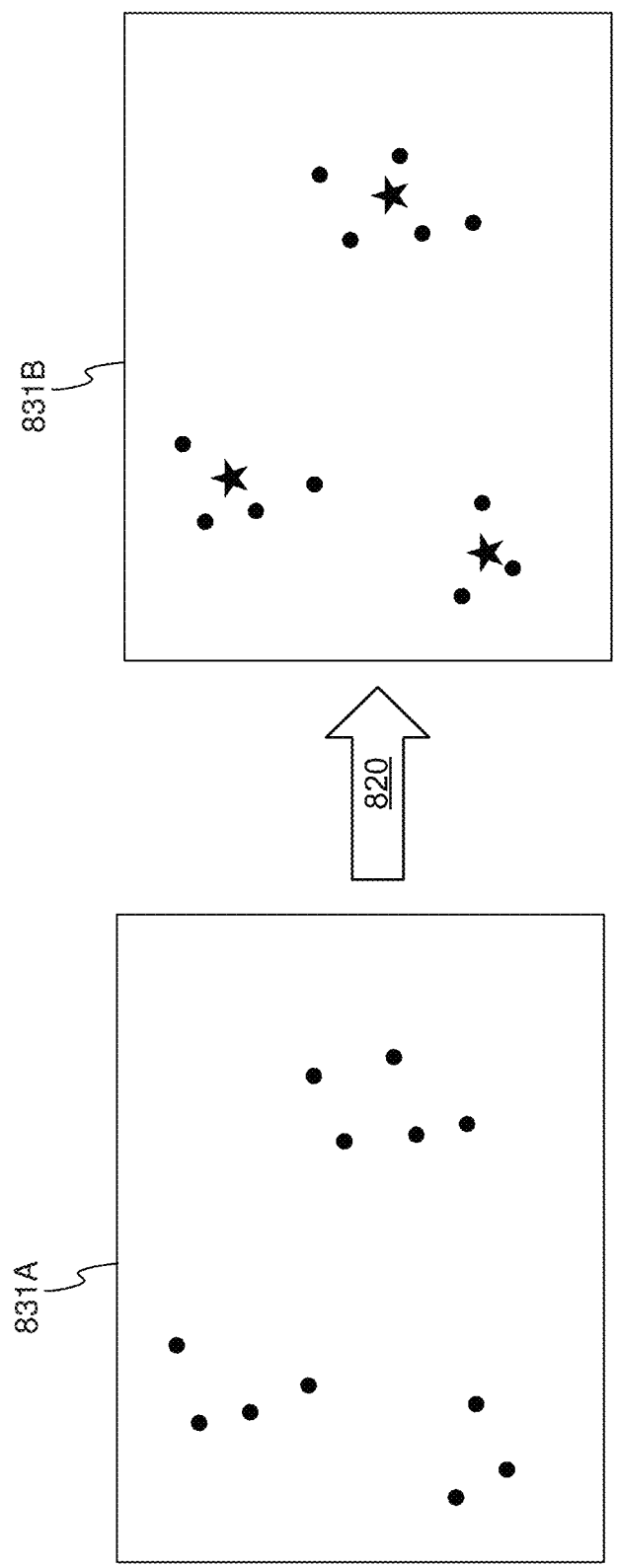
FIG. 8 is a sample diagram for illustrating a two-dimensional example of an adaptive quantization operation embodiment that can be used in the flowchart of FIG. 4.

A two-dimensional example of quantization is shown in FIG. 8. A feature map 831A may have values represented by dots in two-dimensions. A number K for the quantization may be set, which in this case can be 3 (K=3) for the three main clusters of dots in feature map 831A. The quantized feature map 831B may be generated by operation 820, whose values would be represented by the three stars, one near the center of each cluster. The values of the stars can be found in a number of ways. For example, the stars may start at some initial places, and then iterate (assign each original value to the nearest quantized value, then move the "quantized value" to the center of its cluster, etc.).

FIG. 9 shows sample equation expressions 9A, 9B, 9C that are to be minimized. Expression 9A is similar to that of FIG. 6 for adaptive quantization, except that Expression 9A also includes the subscript of 1, where 1=1, 2 for the two layer pairs. Expression 9B can be used for flowchart 643, where F1 denotes the combined operation of the coupled convolution and subsampling layers C1 and S1 (1=1, 2). Expression 9C can be equivalent to expression 9B. The problem can be solved via alternating searching: Fix (w), and solve for (Q); fix (Q) and solve for (w).

From the above, it can be seen that adaptive quantization can be computationally expensive, since new quantized weight values are computed from the original weight values. It is even more expensive when the computations require iterative search. As such, adaptive quantization is not indicated for on-chip implementation in a client device with limited resources. This, however, is not as much a problem for a server system with substantial resources.

Another type of quantization method is called "uniform quantization." Uniform quantization selects quantized values by typically a simple rule, and then determines how many of the original values fit each of the quantized values. Accordingly, uniform quantization is less computationally intensive than adaptive quantization, but the results are not as accurate. A one-dimensional example is now described.

Figures 10, 11:
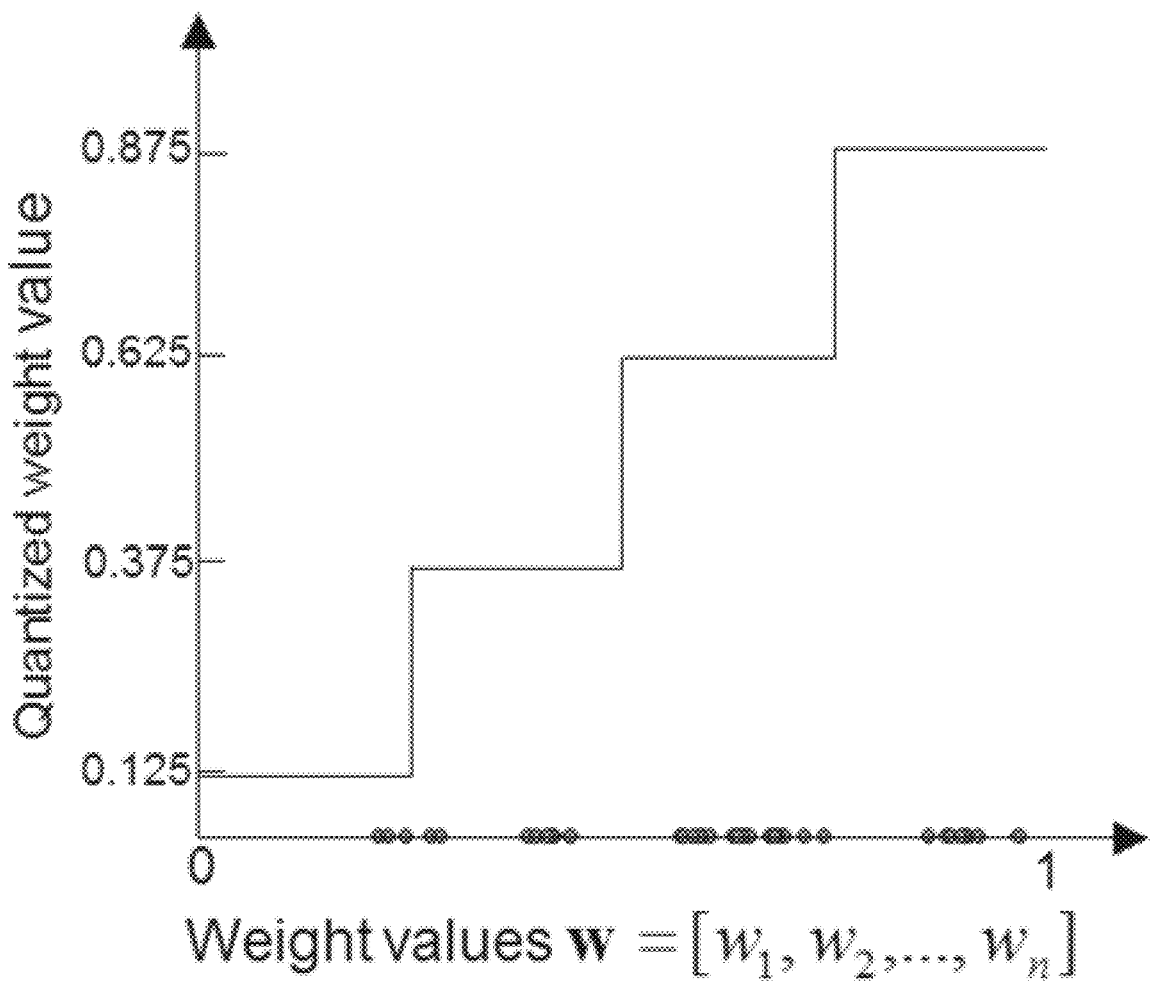
FIG. 10 is a sample equation that may be used to determined quantized values in a one-dimensional uniform quantization operation.
FIG. 11 is a sample diagram for illustrating a one-dimensional example of a uniform quantization operation resulting by applying a version of the equation expression of FIG. 10.

FIG. 10 shows an equation that may be used to determine quantized values Q. The variable delta ($\Delta$) may be set as needed.

FIG. 11 is a sample diagram for illustrating an application of the equation of FIG. 10. In this example, the value of delta ($\Delta$) is set at 4, which will yield 4 quantized values. These quantized values are thus determined to be 0.125, 0.375, 0.625 and 0.875, regardless of the distribution of the weight values in the horizontal axis.

In FIG. 11, a distribution of original weight values (w) between 0 and 1 is shown in the horizontal axis. (In fact, this distribution is identical to that of FIG. 7.) However, in FIG. 7 the results are different, because the quantization method is different.

Returning again to FIG. 1, client device 310 according to embodiments may receive the transferred learned configuration for the neural network (NN) 123 (i.e., network weights), for example according to export operation 244. This configuration will have been prepared in view of training image 102, and many other training images in database 104.

Processes for recognizing images according to exemplary embodiments are now described using flowchart 340 (also of FIG. 1). These processes can be for client device 310 or other configurations of client devices. The processes of flowchart 340 will be described in terms of components of client device 310 as an example only.

According to an optional import operation 344, the configuration of the neural network (NN) 123 is imported. Import operation 344 may perform substantially as the previously described operation 244. Importing can be performed in a number of ways, for example by downloading over a network, loading from a memory device, and so on. The configuration of the neural network (NN) 123 may be imported, for example, to neural network (NN) 323 and to MLP classifier 337. In other instances, the configuration of the neural network (NN) 123 may be stored in memory 330 as additional data 335 at an appropriate time, such as that of manufacture.

According to an input operation 345, an input image may be received and input. This may be performed in a number of ways, for example via input device 305 being configured to receive input image 302.

According to a first generation operation 346, a first interim feature map may be generated. This may be performed in a number of ways, for example by applying the input image to a first convolutional layer, as will be explained in more detail later. Optionally, quantization of the received input image may be performed prior to the received input image being applied to the first convolutional layer.

According to another quantization operation 347, quantization can be performed of the first interim feature map. Quantization may be performed in a number of ways. Preferably, the another quantization operation 347 is a type of uniform quantization described with reference to FIGS. 10 and 11, and is not as taxing to client device 310 as the adaptive quantization performed by server system 110. The another quantization operation 347 may generate a quantized first interim feature map.

According to a second generation operation 348, a second interim feature map may be generated. This may be performed in a number of ways, for example by applying the quantized first interim feature map to a second convolutional layer, as will be explained in more detail later.

According to a recognition operation 349, recognition may be performed of the object in the input image. This recognition will be of course first in terms of mathematics, and can be performed from the second interim feature map. Optionally, quantization of the second interim feature map may be performed prior to the recognition operation being performed.

The operations of the exemplary process provided in flowchart 340 are now described in more detail for client device embodiments that use a neural network (NN) with layer pairs such as those of FIG. 2.

FIG. 12 is a block diagram illustrating an exemplary neural network (NN) 1223 for a client device and an exemplary MLP classifier 1237 for a client device. In this example, neural network (NN) 1223 is substantially similar to the above-described neural network (NN) 323. Neural network (NN) 1223 and an MLP classifier 1237 may have been initialized with the configuration of a neural network prepared in view of a training image, as mentioned above.

As shown in FIG. 12, neural network (NN) 1223 receives an input image 1202, and generates a recognition result 1249. The recognition result 1249 indicates whether a training image is or is not within input image 1202. Neural network (NN) 1223 includes at least a first layer pair 1221 of a first convolutional (C1) layer 1254 and a first subsampling (S1) layer 1258. Neural network (NN) 1223 also includes a second layer pair 1222 of a second convolutional (C2) layer 1264 and a second subsampling (S2) layer 1268. Layer pairs 1221, 1222 may substantially as described above with regard to other layer pairs.

In FIG. 12, arrows show the effect of the operations of flowchart 340. In exemplary embodiments, input image 1202, which has been received by the input device, is applied to first convolutional layer 1254.

Neural network (NN) 1223 can be configured to generate in first subsampling layer 1258 a first interim feature map, in response to input image 1202 being applied to first convolutional layer 1254. This first interim feature map could have first interim original weights.

The processor of the client device (not shown in FIG. 12) can be configured to perform quantization of the first interim feature map. This quantization is shown as operation 1246, and can be unitary quantization or another type. The quantization may generate a quantized first interim feature map. In this particular case, quantizing thus converts the first interim original weights into first interim lower-resolution weights of the quantized first interim feature map. This can include aspects deriving both from ultimately input image 1202 and the stored learned configuration weights.

The quantized first interim feature map can be applied to second convolutional layer 1264. NN 1223 can be configured to generate in second subsampling layer 1268 a second interim feature map, in response to the quantized first interim feature map being applied to second convolutional layer 1264. This second interim feature map could have second interim original weights.

MLP classifier 1237 can be configured to perform recognition of the training image being in the input image. This recognition can be performed from the second interim feature map. Performing this recognition may generate recognition result 1249.

In addition, quantizing can take place at additional locations shown by arrows of operation 1256, 1257. In particular, input image 1202 itself may be quantized prior to being applied to first convolutional layer 1254, as shown by the arrow of operation 1256. Moreover, the second interim feature map may be quantized after being generated at second subsampling layer 1268 and prior to the recognition operation being performed, as shown by the arrow of operation 1257. Again, quantization may be performed by the processor of the client device.

Examples of actual simulations are now described.

FIG. 13 is a group of forty (40) sample training images for handwriting recognition (MNIST handwritten digits). The left-most column of these training images may receive the classification "0" for purposes of the MLP classifier, the next column "1", and so on for a total of 10 classes.

Figure 14:
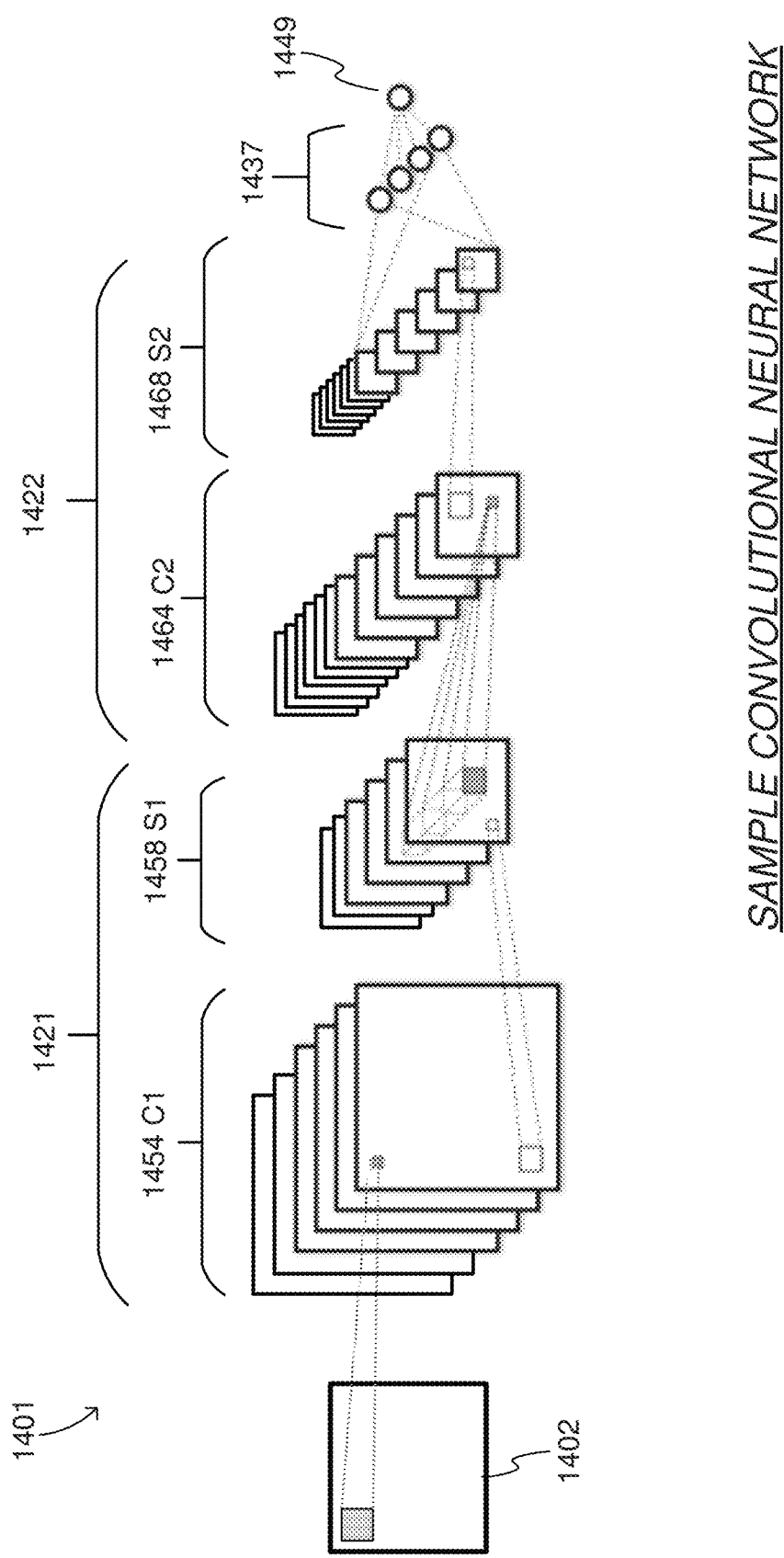
FIG. 14 is a conceptual diagram of sample data structures in a sample convolutional neural network used for performing simulations.

FIG. 14 is a diagram of data structures 1401 in a sample convolutional neural network NN used for performing simulations as per the above. FIG. 14 does not show the quantization operations described above.

Data structures 1401 include a set C1 1454 of six (6) feature maps, each 24×24 pixels, which have been generated by convolution of an image 1402 at a 5*5 kernel. Data structures 1401 also include a set C2 1458 of six (6) feature maps, each 12×12 pixels, which have been generated by subsampling the feature maps of set C1 at/2 (divide-by-2) scale. Data structures 1401 additionally include a set C2 1464 of twelve (12) feature maps, each 8×8 pixels, which have been generated by convolving with a 5*5 kernel. Data structures 1401 further include a set C2 1468 of twelve (12) feature maps, each 4×4 pixels, which have been generated by subsampling the feature maps of set C1 at /2 (divide-by-2) scale. Data structures 1401 moreover include classes 1437 of an MLP classifier, which generates a recognition result 1449.

Training was performed offline, using back propagation (BP) to learn weights. Supervised iterative quantization was used as described above to quantize the learned weights for lower bit resolution. Testing of recognition was then performed given quantization of input or feature maps. Performance was evaluated in terms of the classification error—the smaller the better.

The dimension of the classifier weights connecting to output neurons is much larger than convolutional kernel weights, and in general requires more bits for higher resolution. In this case the resolution bit of the classifier was set as at a fixed value of six (6) bits. Then different bit resolutions of convolutional kernels were evaluated with respect to performance.

FIG. 15 is a table showing simulation results that contrast the simulated performance of embodiments over the prior art. The columns are for number of input resolution bits, and the rows are for the number of weight resolution bits. Each row has three sub-rows for different quantization approaches, the top sub-row being for uniform quantization, the middle sub-row being for k-means adaptive quantization, and the bottom sub-row.

For very low bit resolutions, of course error is very high. It will be observed, however, that with resolutions of only four bits, the same (low) error of only 1.15% is achieved by embodiments as with the original in the first and second sub-rows. In fact, an arrow points out how the original low error table value in the top sub-row is met by a no-worse table value in a bottom sub-row for only four bits of resolution.

Figure 16:
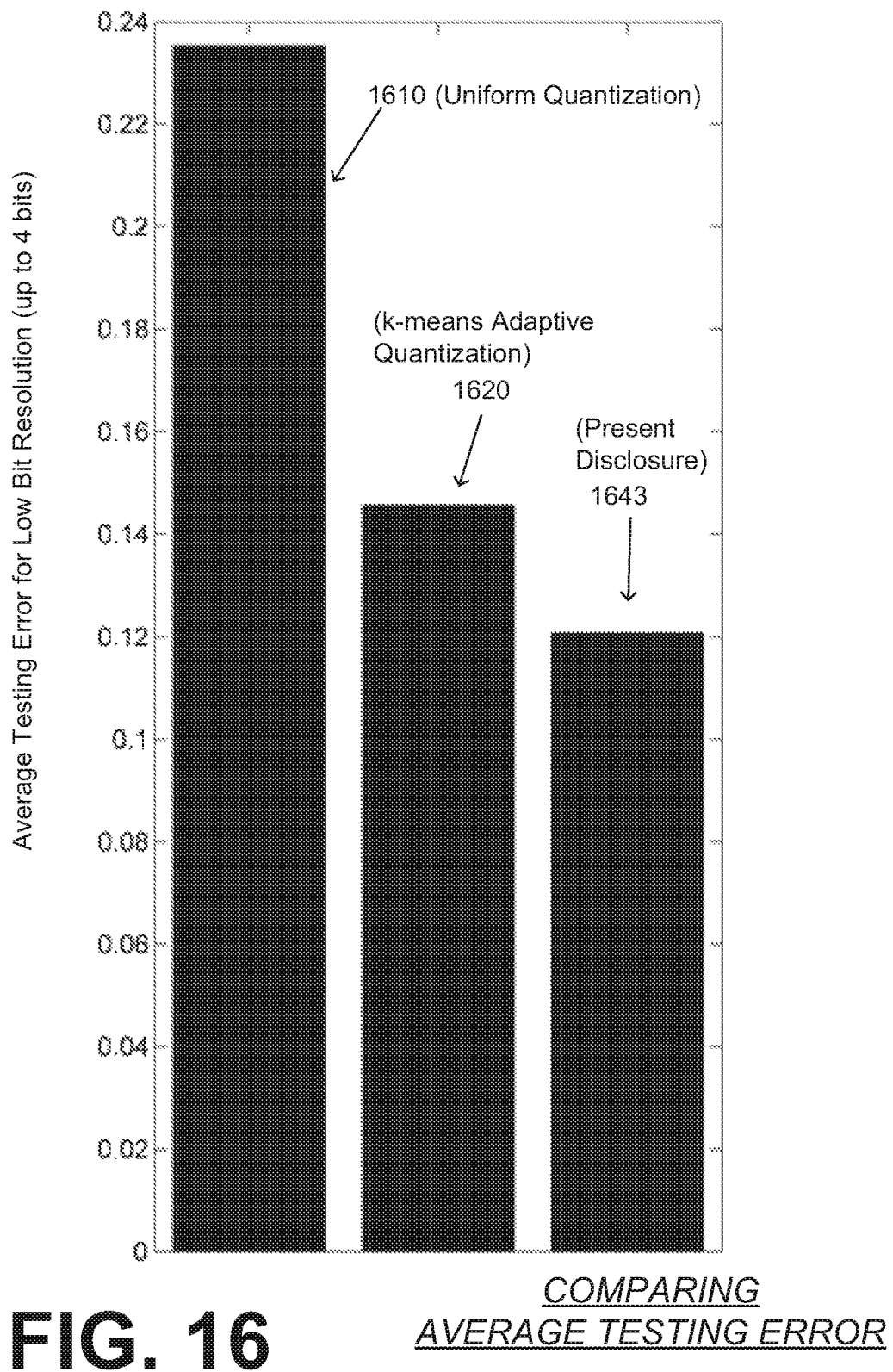
FIG. 16 is a bar chart for contrasting simulated performance of embodiments over the prior art.

FIG. 16 is a bar chart for contrasting simulated performance of embodiments over the prior art. Bars 1610, 1620, 1643 show the average testing error for low bit resolution (up to 4 bits), respectively for a) uniform quantization, b) k-means adaptive quantization, and c) embodiments. Bar 1643 has the lowest error.

Figure 17:
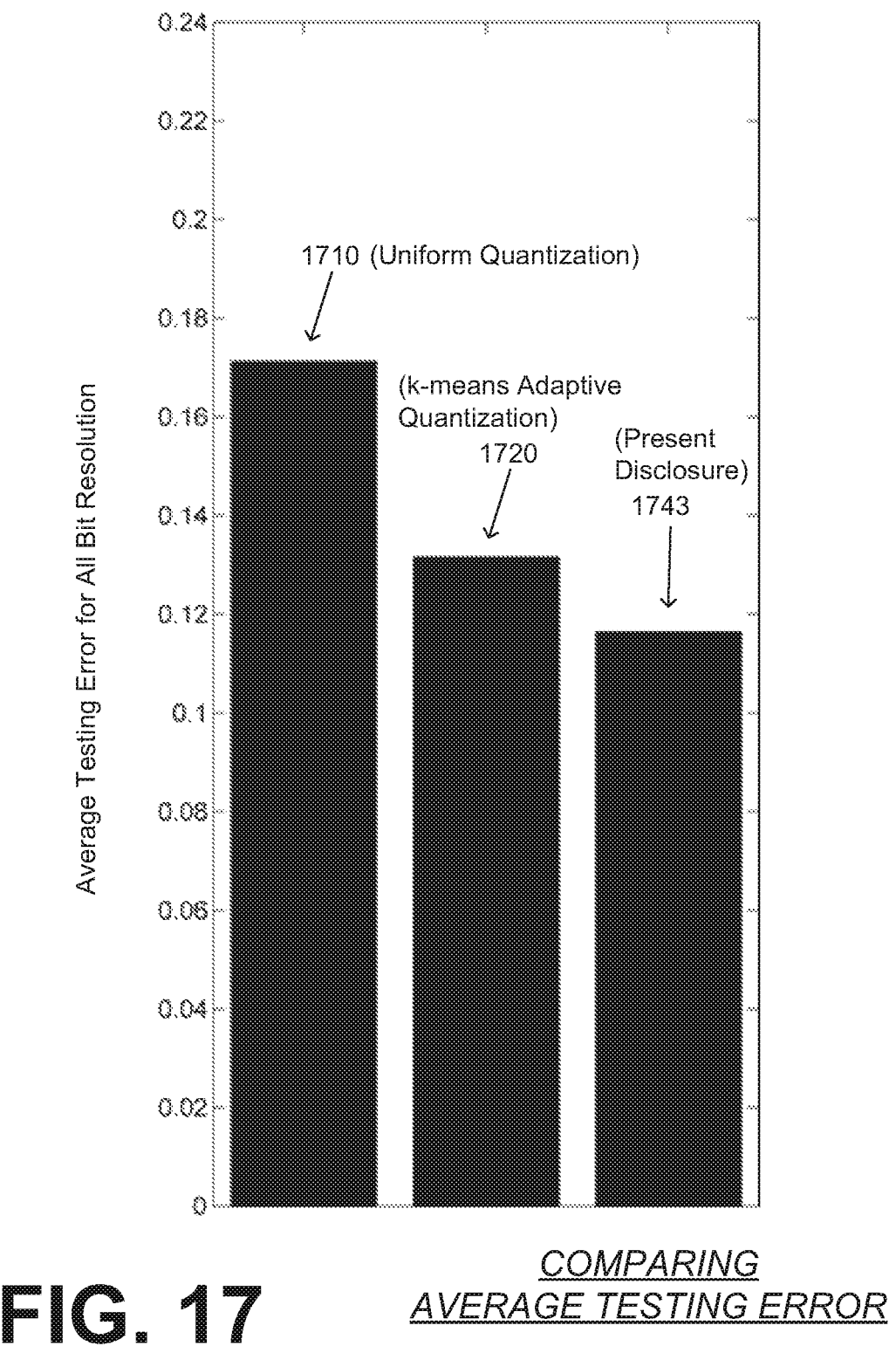
FIG. 17 is another bar chart for contrasting simulated performance of embodiments over the prior art.

FIG. 17 is a bar chart for contrasting simulated performance of embodiments over the prior art. Bar charts 1710, 1720, 1743 show the average testing error for all bit resolution, respectively for a) uniform quantization, b) k-means adaptive quantization, and c) embodiments. Bar chart 1743 has the lowest error.

Figure 18:
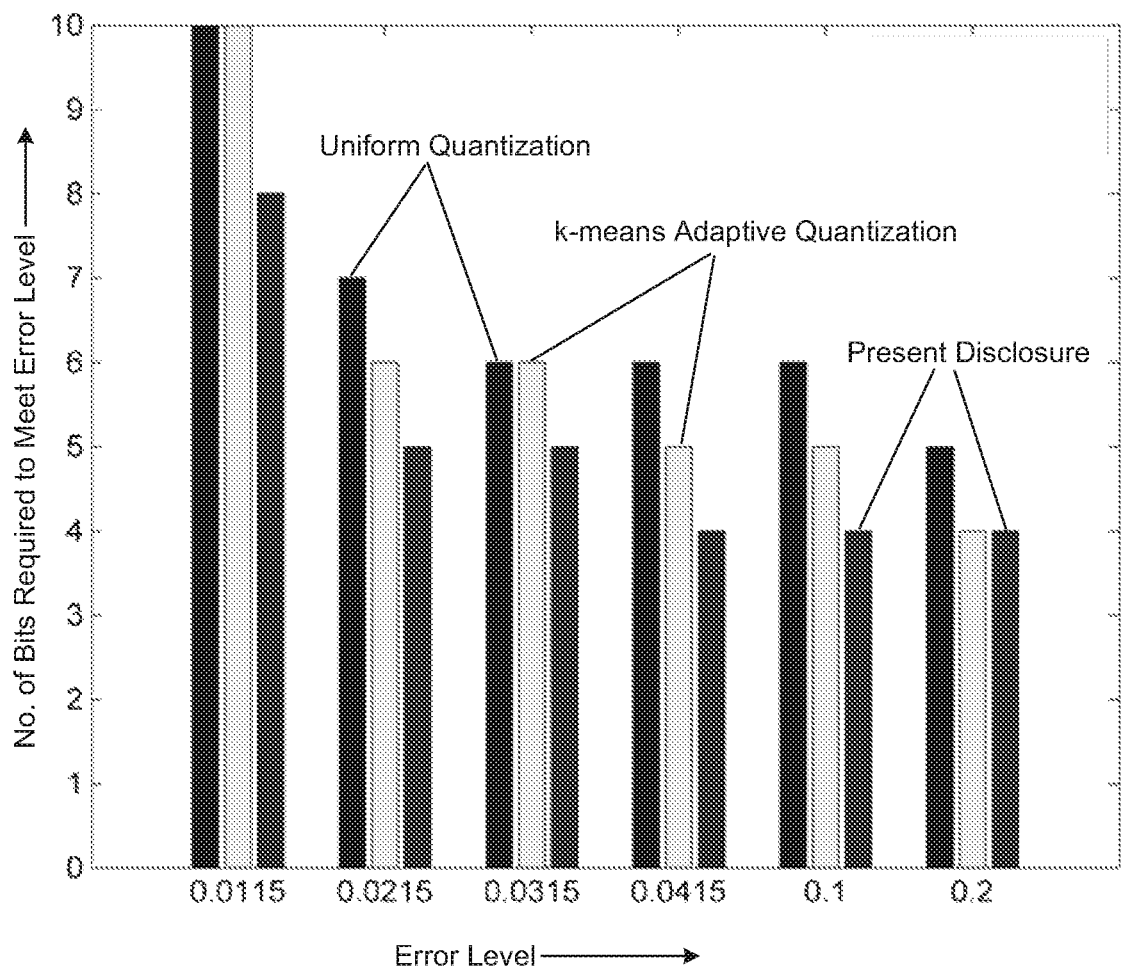
FIG. 18 shows groups of bar charts for contrasting simulated performance of embodiments over the prior art.

FIG. 18 shows groups of bar charts for contrasting simulated performance of embodiments over the prior art. Each group of three bar charts is for the same error, shown along the horizontal axis. Within each group, a) the left-most bar is for uniform quantization, b) the middle bar is for k-means adaptive quantization, and c) the right-most bar is per embodiments. The vertical axis shows the number of total bits required to meet the error level (i.e., for the error level to not be higher). For all testing errors shown, the right-most bar requires the least number of total bits required to meet the error level.

The above described devices and/or systems perform functions, processes and/or methods. These functions, processes and/or methods may be implemented by one or more devices that include logic circuitry. Such a device can be alternately called a computer, and so on. It may be a standalone device or computer, such as a general purpose computer, or part of a device that has one or more additional functions.

Standards of performance are to be judged by a system designer, manufacturer, user or other similarly interested party. The term "substantial" as used herein generally relates to adequacy of resulting system performance.

The logic circuitry may include a processor that may be programmable for a general purpose, or dedicated, such as a microcontroller, a microprocessor, a Digital Signal Processor (DSP), etc. Examples may include processors 120, 320.

The logic circuitry may also include non-transitory computer-readable storage media, such as memories. Such media can be of different types including but not limited to volatile memory, non-volatile memory (NVM), read only memory (ROM); random access memory (RAM); magnetic disk storage media; optical storage media; smart cards, flash memory devices, etc. Examples may include memories 130, 330.

These storage media, individually or in combination with others, can have stored thereon data. Examples of data for storage in storage media include data 135, 335.

In addition, these storage media may store programs that the processor may be able to read, and execute. More particularly, the programs can include instructions in the form of code, which the processor may be able to execute upon reading. Examples include programs 132, 332.

Executing a program is performed by physical manipulations of physical quantities, and may result in the functions, processes, actions and/or methods to be performed, and/or the processor to cause other devices or components or blocks to perform such functions, processes, actions and/or methods. Often, for the sake of convenience only, it is preferred to implement and describe a program as various interconnected distinct software modules or features. These, along with data are individually and also collectively known as software. In some instances, software is combined with hardware, in a mix called "firmware."

Moreover, methods and algorithms are described herein. These methods and algorithms are not necessarily inherently associated with any particular logic device or other apparatus. Rather, the methods and algorithms may be advantageously implemented by programs for use by a computing machine, such as a general-purpose computer, a special purpose computer, a microprocessor, etc.

This detailed description includes flowcharts, display images, algorithms, and symbolic representations of program operations within at least one computer readable medium. An economy is achieved in that a single set of flowcharts is used to describe both programs, and also methods. So, while flowcharts describe methods in terms of boxes, they also concurrently describe programs.

In the methods described above, each operation can be performed as an affirmative step of doing, or causing to happen, what is written that can take place. Such doing or causing to happen can be by the whole system or device, or just one or more components of it. In addition, the order of operations is not constrained to what is shown, and different orders may be possible according to different embodiments. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily the present invention. Plus, any reference to any prior art in this description is not, and should not be taken as, an acknowledgement or any form of suggestion that this prior art forms parts of the common general knowledge in any country.

This description includes one or more examples, but that does not limit how the invention may be practiced. Indeed, examples or embodiments of the invention may be practiced according to what is described, or yet differently, and also in conjunction with other present or future technologies. Other embodiments include combinations and sub-combinations of features described herein, including for example, embodiments that are equivalent to: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

In this document, the phrases "constructed to" and/or "configured to" denote one or more actual states of construction and/or configuration that is fundamentally tied to physical characteristics of the element or feature preceding these phrases and, as such, reach well beyond merely describing an intended use. Any such elements or features can be implemented in any number of ways, as will be apparent to a person skilled in the art after reviewing the present disclosure, beyond any examples shown in this document.

The following claims define certain combinations and subcombinations of elements, features and steps or operations, which are regarded as novel and non-obvious. Additional claims for other such combinations and subcombinations may be presented in this or a related document.

What is claimed is:

1. A device, comprising:
a processor; and
a memory,
the processor and the memory being configured as a neural network comprising:
at least one layer comprising an input and an output, the layer configured to receive an input feature map at the input and output an output feature map at the output, at least one of the input feature map and the output feature map comprising at least one first weight kernel value that has been quantized by a unitary quantizing operation to reduce a number of bits of the first weight kernel value from a first predetermined number of bits to a second predetermined number of bits that is less than the first predetermined number of bits without changing a dimension of the feature map corresponding to the quantized first weight kernel value.

2. The device of claim 1, wherein the neural network further comprises at least one interim feature map between the input and the output of the layer, the interim feature map comprising at least one second weight kernel value that has been quantized by the unitary quantizing operation to reduce a number of bits of the second weight kernel value from a third predetermined number of bits to a fourth predetermined number of bits that is less than the third predetermined number of bits without changing a dimension of the interim feature map corresponding to the quantized second weight kernel value.

3. The device of claim 2, wherein the second weight kernel value is further quantized by one of the unitary quantizing operation or a supervised iterative quantization operation.

4. The device of claim 1, wherein the first weight kernel value is further quantized by one of the unitary quantizing operation or a supervised iterative quantization operation.

5. The device of claim 1, wherein the input feature map comprises an input feature map of an image.

6. The device of claim 1, wherein the neural network comprises a convolutional neural network.

7. The device of claim 1, wherein the device comprises a smartphone, a tablet computer, a portable electronic device, a computer or a server.

8. The device of claim 1, wherein the neural network is configured to perform object recognition.

9. A device, comprising:
a processor; and
a memory,
the processor and the memory being configured as a neural network comprising:
at least one layer comprising an input and an output, the layer configured to receive an input feature map at the input and output an output feature map at the output, at least one of the input feature map and the output feature map comprising at least one first weight kernel value that has been quantized by a supervised iterative quantization operation to reduce a number of bits of the first weight kernel value from a first predetermined number of bits to a second predetermined number of bits that is less than the first predetermined number of bits without changing a dimension of the feature map corresponding to the quantized first weight kernel value.

10. The device of claim 9, wherein the neural network further comprises at least one interim feature map between the input and the output of the layer, the interim feature map comprising at least one second weight kernel value that has been quantized by the supervised iterative quantization operation to reduce a number of bits of the second weight kernel value from a third predetermined number of bits to a fourth predetermined number of bits that is less than the third predetermined number of bits without changing a dimension of the interim feature map corresponding to the quantized second weight kernel value.

11. The device of claim 10, wherein the second weight kernel value is further quantized by one of a unitary quantizing operation or the supervised iterative quantization operation.

12. The device of claim 9, wherein the first weight kernel value is further quantized by one of a unitary quantizing operation or the supervised iterative quantization operation.

13. The device of claim 9, wherein the input feature map comprises an input feature map of an image.

14. The device of claim 9, wherein the neural network comprises a convolutional neural network.

15. The device of claim 9, wherein the neural network is configured to perform object recognition.

16. The device of claim 9, wherein the device comprises a smartphone, a tablet computer, a portable electronic device, a computer or a server.

17. A device, comprising:
a processor; and
a memory,
the processor and the memory being configured as a neural network comprising:
at least one first layer comprising an input and an output, the first layer configured to receive an input feature map at the input and output an output feature map at the output, the neural network further comprising at least one interim feature map between the input and the output of the first layer, the interim feature map comprising at least one first weight kernel value that has been quantized by a unitary quantizing operation or a supervised iterative quantization operation to reduce a number of bits of the first weight kernel value from a first predetermined number of bits to a second predetermined number of bits that is less than the first predetermined number of bits without changing a dimension of the interim feature map corresponding to the quantized first weight kernel value.

18. The device of claim 17, wherein the neural network further comprises at least one second layer comprising an input and an output, the second layer configured to receive an input feature map at the input and output an output feature map at the output, at least one of the input feature map and the output feature map comprising at least one second weight kernel value that has been quantized by the unitary quantizing operation or the supervised iterative quantization operation to reduce a number of bits of the second weight kernel value from a third predetermined number of bits to a fourth predetermined number of bits that is less than the third predetermined number of bits without changing a dimension of the feature map corresponding to the quantized second weight kernel value.

19. The device of claim 17, wherein the input feature map comprises an input feature map of an image.

20. The device of claim 17, wherein the device comprises a smartphone, a tablet computer, a portable electronic device, a computer or a server.

* * * * *